United States Patent [19]

Mehta et al.

[11] 3,795,898

[45] Mar. 5, 1974

[54] RANDOM ACCESS READ/WRITE SEMICONDUCTOR MEMORY

[75] Inventors: Rustam J. Mehta, Sunnyvale; Mike Geilhufe, Los Gatos; Thomas L. Palfi, Cupertino, all of Calif.

[73] Assignee: Advanced Memory Systems, Sunnyvale, Calif.

[22] Filed: Nov. 3, 1972

[21] Appl. No.: 303,420

[52] U.S. Cl............ 340/173 R, 340/172.5, 307/238

[51] Int. Cl............................................ G11c 11/34

[58] Field of Search........ 340/173 R, 172.5, 173 CP

[56] References Cited

UNITED STATES PATENTS

| | | | |
|---|---|---|---|
| 3,680,061 | 7/1972 | Arbab | 340/173 R |
| 3,740,730 | 6/1973 | Ho | 340/173 CP |
| 3,757,310 | 9/1973 | Croxon | 340/173 R |

*Primary Examiner*—Terrell W. Fears

[57] ABSTRACT

A Random Access Read/Write Semiconductor Memory for fabrication in integrated circuit form using field effect devices. The memory is a dynamic memory having a provision for maintaining DC stability in the four transistor memory cells so as to not require periodic refreshing. Various unique buffer and timing circuitry is also provided for minimizing power consumption, for compatibility with TTL circuitry, and for providing very fast read/write access from a single clock signal.

25 Claims, 20 Drawing Figures

RANDOM ACCESS READ/WRITE SEMICONDUCTOR MEMORY

BACKGROUND OF THE INVENTION

1. Field of the Invention

This invention relates to the field of memory circuits, and particularly to integrated memory circuits utilizing field effect devices.

2. Prior Art

Memory matrices using various types of data storage cells are well known in the prior art, as are various means for addressing the memory. Of particular interest to the present invention are what are commonly referred to as MOS type memories. The designation MOS technically stands for a field effect device having a metal gate insulated from the silicon substrate by an oxide layer. More recent developments in the field have included silicon gate devices and may further include an insulating layer such as silicon nitride as opposed to an oxide layer. Thus, the term MOS, as may be used herein, is sued in the general or generic sense to indicate the general class of devices which may be otherwise referred to as field effect devices, insulated gate devices and/or surface effect devices. Similarly, terms such as insulated gate devices, field effect devices, etc., are used herein to also indicate this broad category or devices, as such terms are now commonly used in this broader sense. Such devices are usually physically characterized as having first and second regions of a first conductivity type separated by an intermediate region of the second conductivity type, over which there is a con-ductive gate electrically separated or insulated from the intermediate region. By applying a voltage of the proper polarity to the gate, the surface of the intermediate region is effectively caused to change conductivity type between the first and second regions. Thus, the gate is characterized as being substantially insulated from the substrate, though having a significant capacitance both with respect to the first and second regions, and particularly with respect to the substrate. The conductivity between the first and second regions is a function of the gate voltage (as well as device size and geometry). Because of the extremely high DC impedance of the gate and the significant capacitance thereof, as well as capacitance associated with the various lines and other circuit components connected to the gate and first and second regions, the gate of such a device will tend to remain at a given voltage differential with respect to the first and second regions until driven to a second voltage dfferential, at least within a relatively short time period characteristic of memory access and read/write times. Some dynamic MOS memories are comprised of memory cells of flip flop circuits generally arranged so as to store data as a result of stored charges in the MOS devices and the various interconnections thereto. The memory is periodically refreshed by increasing the voltage supplied thereto so as to replenish the charges before the state of the flip flop becomes indeterminate. To accomplish the refreshing, each memory cell must be addressed at least once within a predetermined time, typically on the order of every few milliseconds. Such memories are usually organized so that an entire row or entire column may be addressed to refresh each cell within the row or column, thereby cutting down on the amount of otherwise useful memory time which must be devoted to the refresh operation. However, in a large memory system, the time devoted to refreshing which cannot also be used for the read or write operation is significant, and more importantly, may necessarily interfere with the immediate random access capability as seen from the peripheral equipment communicating with the memory.

Also, prior art semiconductor memories generally require various buffer and timing circuits to be utilized therewith, as the memory itself generally requires a plurality of timing signals carefully timed with respect to each other for the proper operation of the memory, and further, generally require buffer circuitry to interface the memory inputs and outputs with commonly used circuitry such as TTL circuitry.

There is therefore a need for a semiconductor memory having very little power consumption and a high operating speed, whish is compatible with the more commonly used mating circuitry such as TTL circuitry, and which is operative with a single noncritical timing signal without requiring a special provision for refreshing.

BRIEF SUMMARY OF THE INVENTION:

A Random Access Read/Write Semiconductor Memory for fabrication in integrated circuit form using field defect devices. The memory is a dynamic memory having a provision for maintaining DC stability in the four transistor memory cells, by way of charge pump devices driven with a suitable AC signal, so that the memory cells do not require periodic refreshing. Various unique buffer and timing circuitry is also provided for minimizing power consumption for compatibility for TTL circuitry and for providing very fast read/write access from a single clock signal. Upon the occurrence of the clock signal, the TTL address buffers couple the addresses to the decoders, and internal signal generators generate a reference signal delayed with respect to the input reference signal so that upon the occurrence of the delayed signal, the decoded addresses are coupled with the memory matrix and a read or write operation is executed. A data input buffer, also compatible with TTL inputs, is used to interface the data input for execution of a write operation. The internally generated delay signal is generated through the use of a circuit similar to the decoders, but specifically being fabricated so as to have a slightly increased "decoding" time to assure complete decoding of the addresses prior to the occurrence of this delayed signal. Upon the addressing of a particular column, a sense amplifier for that pair of column cell lines detects an initial unbalance in the voltages of the column cell lines and quickly amplifies that unbalance to drive the column cell lines to the full MOS logic levels. The TTL address buffers, the data input buffers and the sense amplifiers all utilize a form of clocked flip-flop to provide very rapid drive with minimal power consumption. Various power save circuits are also disclosed, which minimize the power consumption, in the various circuits while assuring very rapid response of the circuits and providing means for overcoming the threshold level of the MOS devices without a separate reference voltage being required. While the invention is disclosed with respect to a specific embodiment, that is a 32 by 32 memory matrix, matrices of other sizes may readily be fabricated, and the individual circuits of the present invention may be used alone or in combination with memory cells of a different design, as well as in other types of electronic equipment.

DETAILED DESCRIPTION OF THE INVENTION

The present invention can be best described with reference to a specific embodiment thereof. Accordingly, there shall be described herein a 1,024 bit memory device having a 1,024 by 1 bit organization. The particular embodiment to be described shall also be described with respect to a specific structure; that is, a structure utilizing N channel devices which may be fabricated using the present art of fabrication of such devices. N Channel devices are electrically characterized as having first and second regions, commonly referred to as source and drain regions, which are effectively electrically isolated from each other when the gate voltage is in the low state but are joined by a conductive path beneath the gate when the gate voltage is in the high state. Thus, such devices may be considered to be conductive or "on" when the gate voltage is in the high state and not conductive or "off" when the gate voltage is in the low state. However, as shall subsequently be seen herein, such devices have a substantial impedence even when conductive so that two devices connected in series and turned on may be used to divide down a power supply voltage without damage to the devices or unreasonably large power consumption. It is to be understood, however, that other devices, such as by way of example Channel P devices, as well as any of the other MOS type devices, may also be used in the construction of the present invention memory device.

Figure 1:
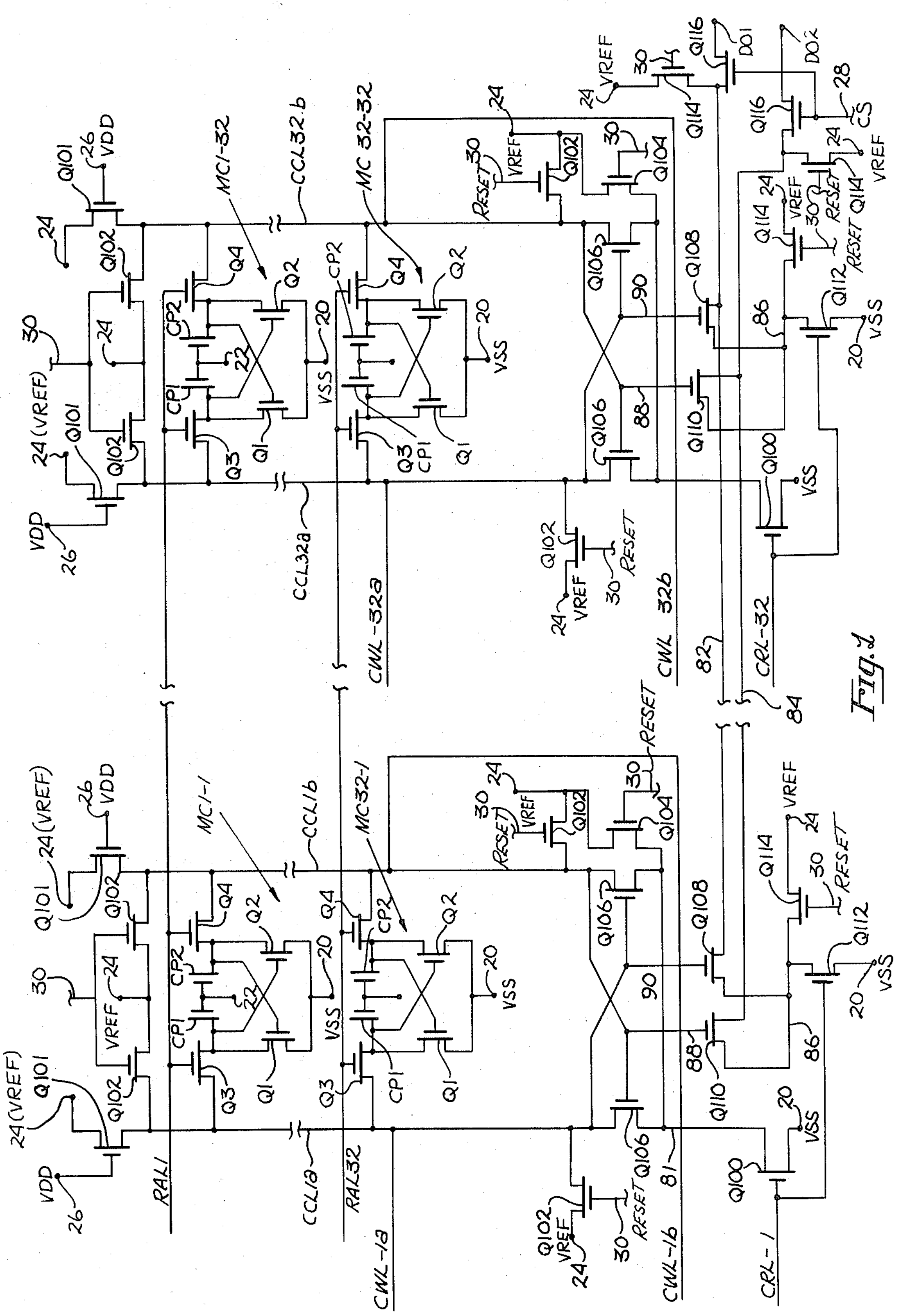
FIG. 1 is a circuit diagram illustrating the memory cell design, the matrix layout and the circuits for the sense amplifier and coupling means for coupling the output of the sense amplifier to the output terminals.

Now referring to FIG. 1, the basic memory matrix for the embodiment to be described may be seen. The matrix is a 32 by 32 cell matrix, though only the cells representing the corners of the matrix have been specifically shown in FIG. 1 for purposes of clarity. Thus, there is a cell generally indicated by the identification MC1-1, with the MC designating a memory cell, the first (1) indicating the first row and the second (1) indicating the first cell in the first row. Thus, there is also shown the last cell in the first row designated MC1-32. Similarly, the lower left hand cell in the matrix, being the first cell in the last row, is designated MC32-1, and the cell in the lower right hand corner representing the 32nd cell in the 32nd row, being designated as MC32-32. Thus, in the first and last rows there are an additional 30 cells between the two corner cells shown, and in addition are 30 additional rows of 32 cells located between the top and bottom rows indicated by the corner cells in the figure.

Each of the memory cells, such as cell MC1-1, has a pair of devices Q1 and Q2 connected to terminal 20, identified as VSS, representing the negative power supply terminal and corresponding to the low state voltage. A pair of charge pump devices CP1 and CP2, subsequently described in greater detail, supply a very small current to both device Q1 and Q2 to overcome any possible leakage current therein. If the gate of device Q1 is in the high state, Q1 will be conducting, thereby maintaining the gate of Q2 in the low state, and maintaining Q2 in the off condition. Thus, the charge pump device CP2 maintains the gate voltage on device Q1, which in turn conducts the current provided by the charge pump device CP1 so as to prevent the increase in the gate voltage of device Q2. Consequently, the charge pump devices CP1 and CP2 will maintain devices Q1 and Q2 in this state indefinitely. Also, it may be seen that if by some previous occurrence device Q2 is turned on, device Q1 will be turned off as a result thereof, which condition also will be maintained until changed by the charge pump devices.

Thus, the combination of the four devices Q1, Q2, CP1 and CP2 provide a DC stable flip-flop type circuit with the charge pump devices providing only such current as is reasonably necessary to provide leakage currents from causing a change in state or an ambiguity in state of the devices Q1 and Q2. As a result, no refresh is required and the state of the various memory cells, once set, will remain indefinitely or until changed as hereinabout to be described, so long as the substrate bias and charge pump signal persist.

Each of the 32 memory cells in each column of the melory matrix is coupled through devices Q3 and Q4 to column cell lines, generally indicated by the letters CCL, followed by the column number and an *a* or *b* indicating the particular one of the two column cell lines for each column. Thus, for the first column, each memory cell is coupled through devices Q3 and Q4 to the column cell lines CCL1*a* and CCL1*b*, whereas all cells in the 32nd column are coupled to the column cell lines CCL32*a* and CCL32*b*. All gates in the devices Q3 and Q4 within a cell row are coupled together. Thus, all gates in the first row of 32 cells are coupled to a line identified as RAL1, and all of the gates or devices Q3 and Q4 in the 32nd row are coupled to a line identified as RAL32. These lines provide the row address lines (RAL's) for the matrix of memory cells. By way of example, if row address line RAL1 is in the high state, devices Q3 and Q4 for each memory cell in the line are turned on, thereby communicating the state of the memory cells in the row to the corresponding column cell lines.

The charge pump devices CP1 and CP2 are compatible with the construction of the other devices in the memory circuit in that they utilize insulated gates and one region similar to the source and drain regions in the other devices. By applying an AC voltage to the gates of the devices, specifically terminals 22, a very small current may be caused to flow. The pumped current, of course, has a peak voltage determined by the AC voltage applied to terminal 22, and the current pumping rate, while dependent upon frequency, voltage, etc., applied to the gate is, in any event, very low, it is adequate to overcome any leakage in the devices Q1 and Q2 and the surrounding circuitry to maintain a predetermined state in these two devices. Charge pumping is described in a paper entitled Charge Pump Random-Access Memory, delivered at the 1972 IEEE International Solid-State Circuits Conference, and published as the proceedings thereof. It is also described in an article entitled "Charge Pumping in MOS Devices" by Burgler and Jespers, published in IEEE Transactions on Electron Devices, Vol. ED-17, No. 3, March, 1969. However, unlike the prior art technology, the present charge pumps preferably utilize a frequency above 50K Hz, more preferably over 100K Hz, and utilize an AC driving signal having a positive excursion exceeding VREF (terminal 24) preferably by the threshold of the devices, and a negative excursion more negative than the substrate bias, preferably by more than 2 volts.

If it is assumed for purposes of explanation that Q1 is on and Q2 is off, Q1 will, of course, readily conduct the charge being pumpied by the charge pump device CP1. At this same time device Q2 is turned off, and assuming Q4 is also off, the charge pump device CP2 is pumping the charge primarily into the gate of the device Q1. However, the peak voltage of the gate of the device Q1, under these conditions, is limited by limiting the amplitude of the Ac voltage applied at terminal 22. Of course, the charge pumping capability of devices CP1 and CP2 is extremely small in comparison to the conduction capability of the other devices such as Q3 and Q4, so that the existence of the devices CP1 and CP2 have negligible effect on the operation of the overall memory, other than to maintain DC stability.

The remaining components shown in FIG. 1 and the function thereof is best described in relation to the various support circuits which, in the present invention, are all part of the same integrated circuit, and particularly is best described in relation to a timing diagram for the overall system. In the following description, aside from terminal 20 (VSS), other common input connections include terminals 24, also identified as VREF, and terminals 26, also identified as VDD.

The present invention semiconductor memory operates with a single clock signal which results in the execution of a read or write operation, depending upon the read/write command signal applied, and maintains the information written into or read out of the address memory cell on a pair of data output lines. Of course, since the memory is a DC stable memory, no timing or other signals are required for refreshing of the memory, so that the occurrence of the clock signal applied to a particular memory chip is in effect a coarse addressing of that particular chip from a larger memory system, which typically will be comprised of a large plurality of such chips. Thus, this clock signal is also in effect a chip select signal, and is identified in the various circuits by the notation CS. As shall subsequently be seen, the memory is constantly maintained in a state of readiness, with the charge pump devices maintaining the state of each memory cell and with a reset signal maintaining various lines in the memory in a precharged state. When the chip select signal goes to the high state, a read or write operation is automatically executed, with the various circuits to be described herein being adapted for maximum speed and minimum power consumption. Within approximately 40 nanoseconds the operation is complete, and the state of the addressed memory cell is presented on the data output lines. When the chip select signal goes to the low state, the data output signals are no longer valid, and the various lines within the circuit are again precharged awaiting the next positive going shift of the chip select signal.

Figures 2A, 2B, 2C, 2D, 2E, 2F, 2G, 2H, 2I:
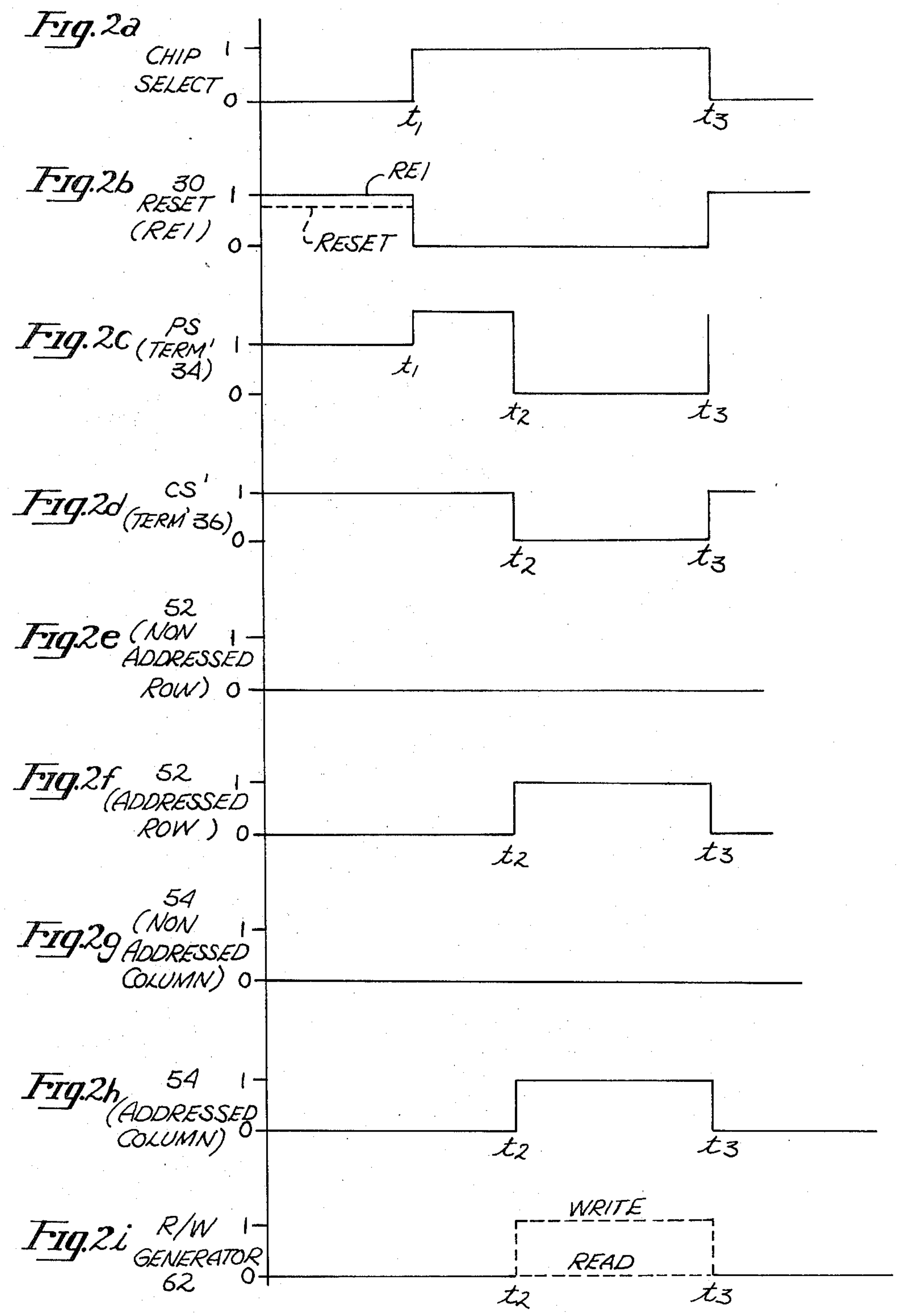
FIGS. 2*a* through 2*i* are timing diagrams illustrating the timing for various signals with the circuits of the present invention.

Thus, a typical profile for the chip select signal is shown in FIG. 2*a*, the (0) and (1) indicating the low and high state respectively. It is assumed that the chip select signal goes to the high state at an arbitrary time T1. This signal is applied to terminal 28 of the reset generator circuit shown in the schematic of FIG. 3. Before time T1 the chip select signal is in the low state, thereby holding devices Q5 and Q6 in the off condition. Resistor R1 therefore holds the gate of device Q7 in the high state, turning on device Q7 and providing a high state output for the reset signal on terminal 30. The signal on terminal 32, identified as a signal RE1, is substantially the same in wave form as the reset signal on terminal 30, though the signal RE1, while the chip select is in the low state is substantially equal to VDD, whereas the reset signal on terminal 30 is lower than VDD in an amount equal to the threshold voltage of device Q7. Also when the chip select signal on terminal 28 is in the low state, the gate of device Q10 is in the high state, thereby holding device Q10 on and causing the output on terminal 34 to be in the high state. Thus, in accordance with the foregoing, the reset signal on terminal 30, as well as the signal RE1 on terminal 32, substantially the same in wave form, may be seen in FIG. 2b. Similarly, the signal on terminal 34 may be seen in FIG. 2C.

Figure 4:
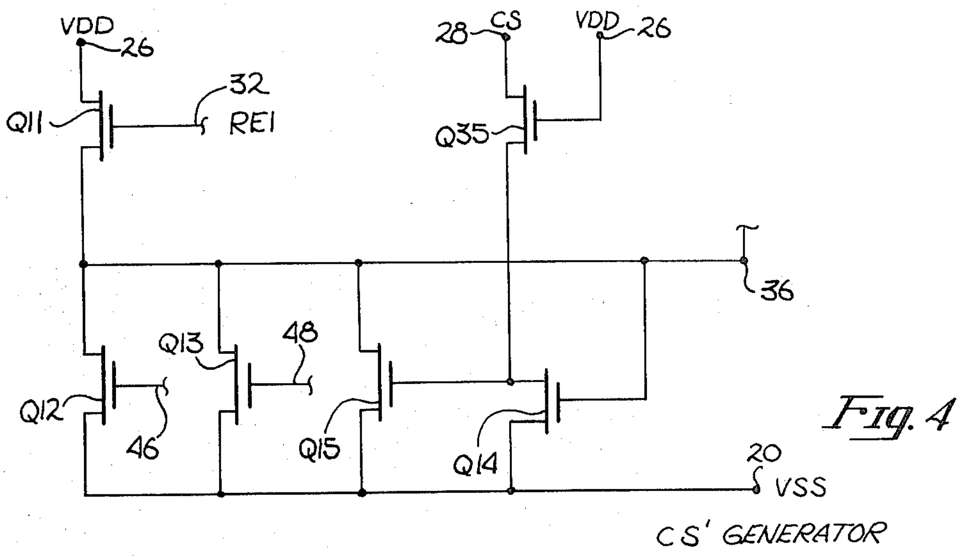
FIG. 4 is a circuit diagram for the CS prime generator.

Now referring to FIG. 4, a circuit diagram for a signal generator referred to as the CS prime generator may be seen. In this diagram, the signal RE1 on terminal 32 is applied to device Q11. Since this signal is in the high state prior to time T1, device Q11 is on in this condition. Also it will subsequently be shown that the input to the gates of devices Q12 and Q13 are in the low state at this time. Consequently devices Q12 and Q13 are turned off. Since the chip select signal on terminal 28 is in the low state, the signal on terminal 36, referred to herein as CS prime, is in the high state in accordance with the conductance of transistor Q11. Since the chip select signal on terminal 28 is in the low state, the high state signal on terminal 36 maintains device Q14 on, which in turn maintains device Q15 in the off condition, thereby allowing Q11 to control the state of terminal 36. The waveform for this signal ($CS^1$), identified as CSPrime, may be seen in FIG. 2*d*. This signal, as shall subsequently be seen, represents an internally generated timing signal.

Figure 6:
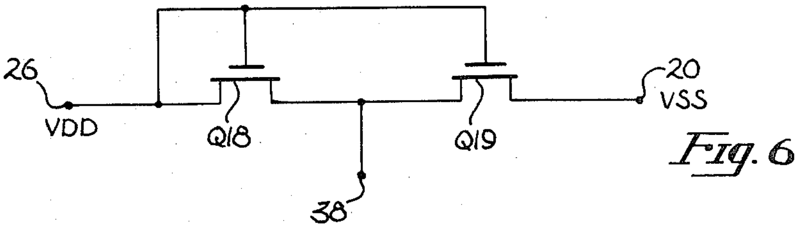
FIG. 6 is a circuit diagram for a second reference voltage generator.
Figures 5, 8, 9:
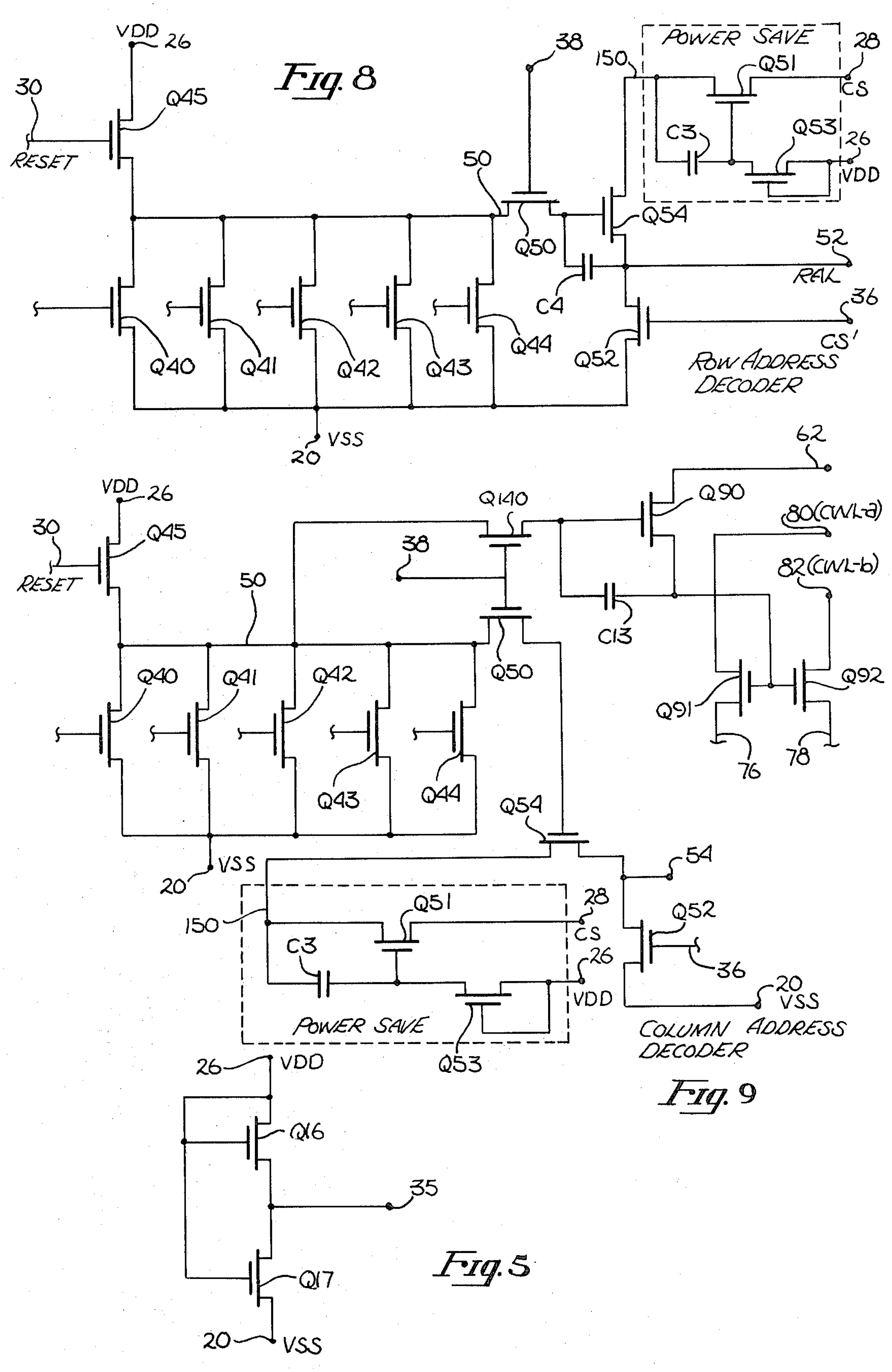
FIG. 5 is a circuit diagram for a reference voltage generator.
FIG. 8 is a circuit diagram for the row address decoders, and further ullustrates the single power save circuit used in conjunction with the plurality of row address decoders.
FIG. 9 is a circuit diagram for the column address decoders, also illustrating the single power save circuit utilized with respect to the plurality of column decoders.

Now referring to FIGS. 5 and 6, circuits for internally generated DC reference voltages may be seen. Since conduction in a field effect device is limited to a surface region between the source and drain, the on impedence of such devices is relatively high compared to the saturation impedence of a junction transistor. In addition, this impedence may be varied within a substantial range by variations in processing and particularly in geometry. Thus, two field effect devices in series, both turned on, may be used as a voltage divider, with the relative impedence of the two devices determining the voltage ratio. In FIG. 5 devices Q16 and Q17 both have their gate coupled to the positive power supply terminal 26 with device Q16 having approximately one-half of the on impedence of device Q17. Accordingly, the output voltage at terminal 35 is approximately one-third of the positive power supply voltage, the negative power supply voltage assumed for purposes of reference only, to be zero. Similarly, in FIG. 6, a reference voltage only slightly below the voltage at terminal 26 (VDD) is created by the series connection of devices Q18 and Q19, both of which are also turned on. In this regard, device Q19 is selected to have an impedence approximately 100 times that of device Q18 so that the output voltage on terminal 38 is only slightly lower then the positive power supply voltage VDD.

Figures 7, 10, 11:
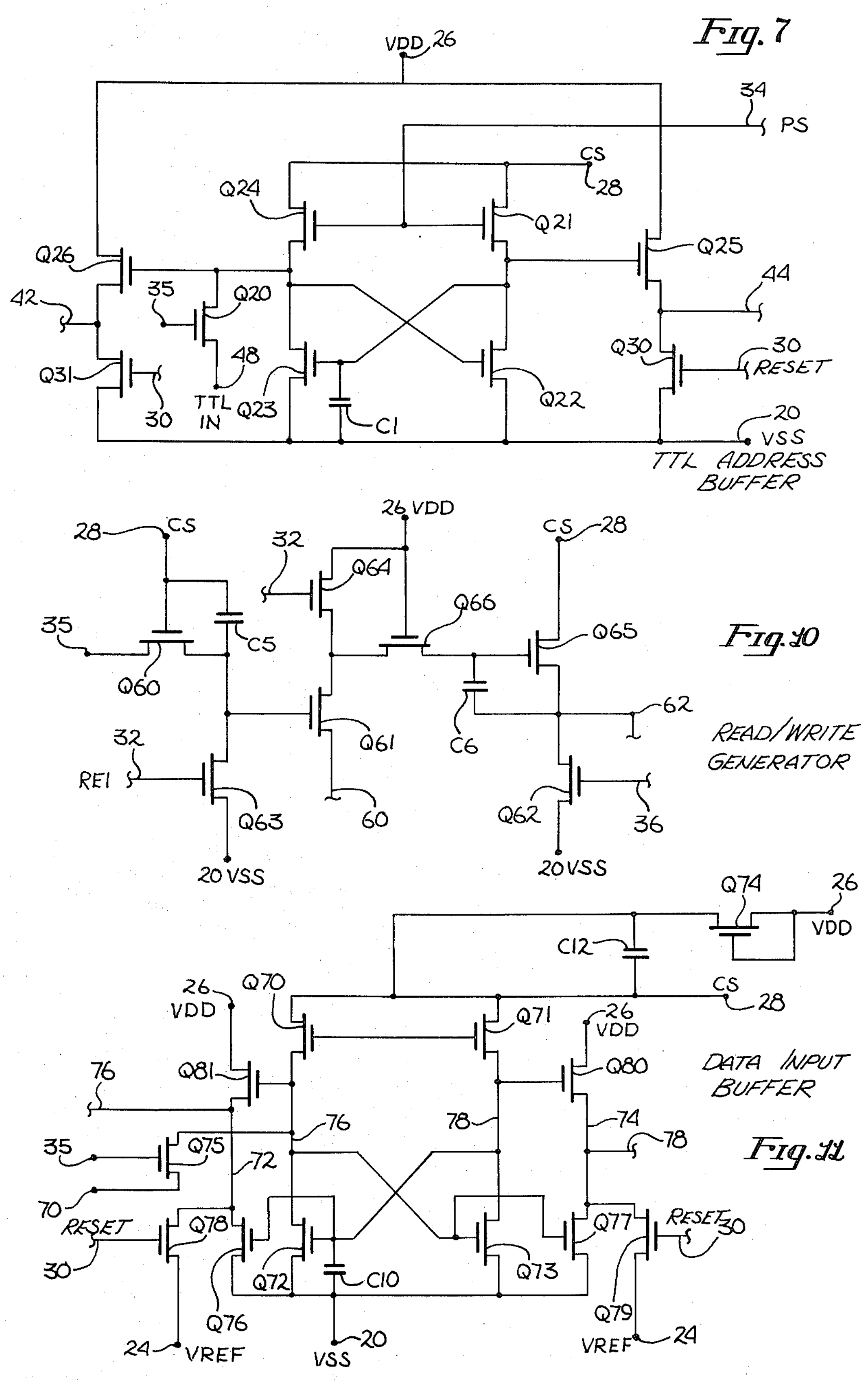
FIG. 7 is a circuit diagram for the TTL address buffer.
FIG. 10 is a circuit diagram of the read/write generator.
FIG. 11 is a circuit diagram of the data input buffer utilized to execute a write operation.

Now referring to FIG. 7, the TTL address buffer may be seen. One such circuit is used for each bit of the ten-bit address signal for the particular embodiment described herein. This signal is applied through device Q20 on terminal 48, with the gate of device Q20 being coupled to terminal 35 of the reference voltage circuit of FIG. 4. The purpose of the reference voltage applied to terminal 36 is to shift the on-off characteristics of device Q20 responsive to the state of the input on terminal 48 to the TTL switching levels, so that the TTL high and low states applied at terminal 48 may result in device Q20 being turned off and turned on respectively. Th TTL address buffer has a flip flop circuit comprised of devices Q21, Q22, Q23, and Q24, with the chip select signal on terminal 28 providing the supply voltage to the flip flop, and the signal on terminal 34 further controlling the flip flop through the gates of devices Q21 and Q24. A small capacitor C1 is coupled between the gate and the source region of device 23 to initially determine the state of the flip flop upon application of power thereto, until and unless overridden by an opposite control signal. The capacitor C1 in the integrated circuit may be comprised of an overlap of the gate region with the source region so as to intentionally result in a relatively high gate source capacitance.

Before time T1 the signal on terminal 34 is in the high state, and therefore devices Q24 and Q21 are on. However, the chip select signal and terminal 38 are at the low state, and thus the gates of devices Q25 and Q26 are both in the low state. Similarly, before time T1, the reset signal on terminal 30 applied to the gates of devices Q30 and Q31 of the address buffers is in the high state, thereby clamping the signals of terminals 42 and 44 in the low state. Also before time T1, the CS prime signal on terminal 36 is in the high state, clamping device Q35 on (FIG. 3), thereby clamping device Q36 off. Device Q37 is permanently on.

Figure 3:
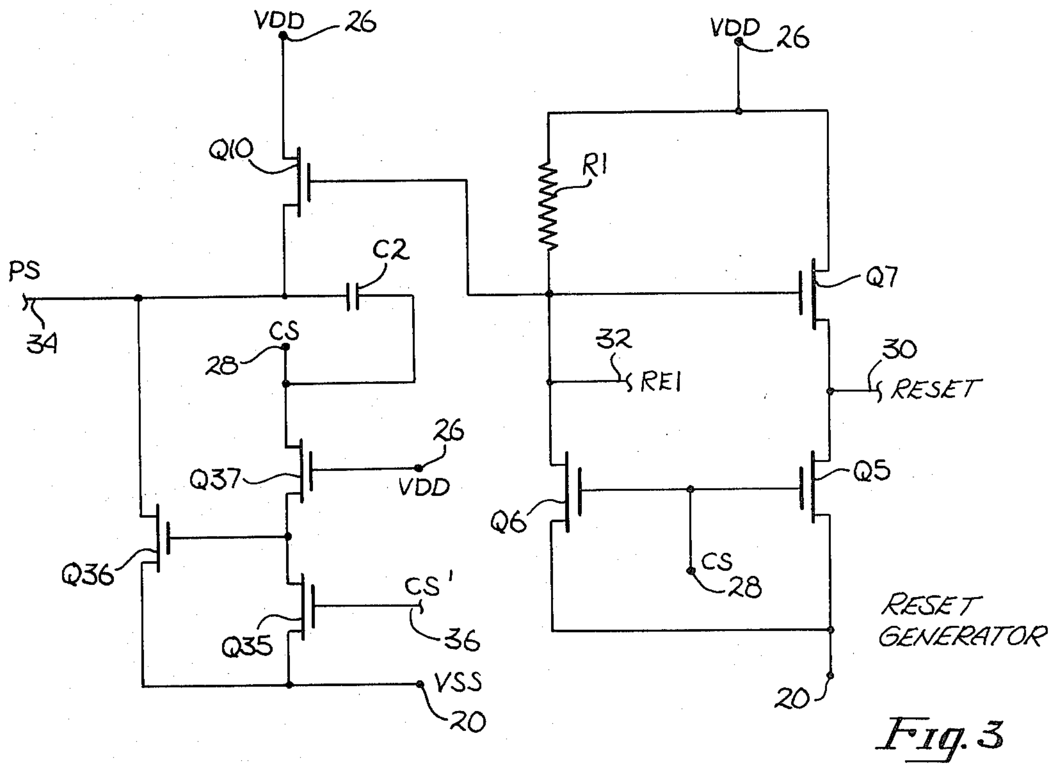
FIG. 3 is a circuit diagram for the reset generator.

At time T1 the chip select signal on terminal 28 goes to the high state, causing the reset signal on terminal 30 and the RE1 signal on terminal 32 to both go to the low state as hereinbefore described. This turns off device Q10 in the reset generator (FIG. 3). At the same time, in the CS Prime Generator (FIG. 4), device Q11 is turned off by the RE1 signal. The voltage on terminal 36, however, will not change immediately, as device Q12, Q13 and Q15 are also off, and the capacitance of the line will maintain the voltage momentarily. The chip select signal on terminal 28 to the CS Prime Generator is coupled through device Q35 to device Q14 and the gate of Q15. However, Q14 is maintained in the on condition by the precharging of terminal 36 to the high state, so that the devices Q14 and Q35 act as a voltage divider, holding down the voltage to the gate of device Q15 and temporarily maintaining Q15 in the off condition.

At time T1 the chip select signal on terminal 28 applied to device Q37 the reset generator goes to the high state. At this time both devices Q37 and Q35 are turned on but the ratio of impedances of these two devices is chosen such that the gate voltage of device Q36 is sufficiently low to keep Q36 off. Capacitor C2, connected between terminals 34 and 28 transmits a portion of the positive transition of the chip select signal to terminal 34. Consequently, the voltage of terminal 34 changes from a high state to a voltage substantially over the high state (the effect of capacitor C2 is to provide charge to the circuits coupled to terminal 34, this charge being adequate to maintain the voltage of these lines at a level greater than the high state voltage). Thus, in the TTL address buffer, devices Q21 and Q24 are turned on by the high state gate signal both to terminals 28 and 34, thereby activating the flip flop. The capacitor C1 will set the flip flop so as to maintain the gate of device Q25 on low state, thereby allowing terminal 44 to remain in the low state even though device Q30 is now off. Similarly, the gate of device Q26 will be in the high state. However, a signal applied at terminal 48 may override the capacitor C1 and cause the flip flop to be set in the opposite state, thereby reversing the state of terminals 42 and 44. Thus it may be seen that terminals 42 and 44 provide signals which are the inverse of each other and are responsive to a single bit of TTL address information applied at terminal 48. Since a ten bit address is required to address a 1,024 bit memory, 10 TTL address buffers are used. The output of the first address buffer is applied to terminal 46 and 48 of the CS prime generator (FIG. 4). Since these two signals are the inverse of each other, one of devices Q12 and Q13 must be turned on. This forces terminal 36 into the low state, turning off device Q14, thereby allowing device Q35 to turn on device Q15, further rapidly driving terminal 36 into the low state and clamping it at that state so long as the chip select signal on terminal 28 persists. However, as shall subsequently be seen, devices Q12 and Q13 are substantially the same in function as devices used in the decoder circuits, and by proper proportioning of the device Q12 and Q13, they may be caused to have a switching time slightly longer then the longest switching time (and therefore decoding time) required by the decoders. Thus, the change of terminal 36 from the high state to the low state has been purposely delayed from time T1 by an amount at least equal to or slightly greater than the operating time of the slowest decoder. This delayed switching of the signal on terminal 36, called the CS prime signal, is identified in FIG. 2*d* as occurring at time T2 (In this regard it should be noted that if a first signal is used to change the state of a second signal, the changed state of that second signal will be slightly delayed with respect to the first signal. Thus, the reset signal and the RE1 signal will in fact be slightly delayed with respect to the chip select signal. However, this delay is not functional and is purposely minimized, and for purposes of explanation herein has been neglected in FIG. 2, with only the delays having functional significance, such as the delay in the CS prime signal being shown. Similarly, switching from one state to another state is not instantaneous, as suggested in the figures, but for purposes of explanation, the finite switching rate has been neglected.) In the preferred embodiment, the change in the CS prime signal at time T2 occurs approximately 20 nanoseconds after the change in the chip select signal, as decoding may be generally accomplished within this time period.

When the CS prime signal goes to the low state, device Q35 in the reset generator (FIG. 3) is turned off. Thus, the gate of device Q36 goes to the high state, turning on that device and causing the voltage on terminal 34 to go to the low state as shown in FIG. 2C. This in turn turns off devices Q24 and Q21 in the address buffers (FIG. 6) so that that circuit is no longer dissipating power.

Now referring to FIG. 8 and 9, the row address decoder circuits and the column address decoder circuits respectively may be seen. In the overall organization of the memory, a 10 bit address signal is required to address a signal memory cell location within the 32 × 32 matrix, with five bits required for the row address and five bits required for the column address. Thus, 10 TTL address buffers are used to provide 10 address bits, and an additional 10 bits which are the inverse of the addresses. Five of the TTL address buffers are used to drive the row decoders and five are used for the column decoders. By way of example, the first TTL address buffer will have either terminal 42 or terminal 44 connected to the gates of device Q40 in the row address decoders. The second TTL address buffer will similarly have either terminal 42 or terminal 44 coupled to the gates of device Q41 of the row address decoder, etc. with the tenth address buffer having either of terminals 42 or 44 coupled to the gate of device Q44 of the column address decoder. Before time T1, the reset signal (FIG. 2b) applied to devices Q45 is in high state, and as previously described, the signals on the terminals 42 and 44 of all of the address buffers are in the low state. Thus, device Q45 is on and devices Q40 through Q44 are off, thereby precharging the decoder lines 50 to the high state. The five bit row address has 32 possible combinations of states starting with the combinations 00000, 00001, 00010, etc., and finally ending with the 32nd combination 11111. By appropriate (and different) connection of the gates of devices Q40 through Q44 to terminals 42 or 44 of the five TTL address buffers driving the row address decoders, any one five bit address signal will cause at least one of devices Q40 through Q44 to be turned on in 31 of the 32 address decoders thereby discharging line 50. However, in one of the 32 address decoders, all of the gates of devices Q40 through Q44 will remain in the low state, thereby leaving line 50 charged to the high state.

Accordingly the operation of both row and the column address decoders is as follows:

Prior to time T1 devices Q40 through Q44 are all off. Device Q45 is on and line 50 is charged to the high state. The gates of devices Q50 are coupled to terminal 38 of the reference generator of FIG. 5, thereby maintaining Q50 in the on condition. Also the chip select signal applied to devices Q51 is in the low state, and the CS prime signal applied to devices Q52 is in the high state, thereby maintaining devices Q52 in the on condition so that the voltages on terminals 52 and 54 are in the low state. At time T1 the chip select signal goes to he high state. Devices Q51 are conductive as a result of the connection of devices Q53. Similarly, devices Q54 at this time are turned on as a result of the precharging of lines 50 to the high state. However, devices Q52 are also on at this time as the signal on terminal 36, that is, the CS prime signal, will remain in the high state until time T2. Also devices Q52 are lower impedence devices then the combination of devices Q51 and Q54, so that the voltage on terminal 54 is maintained at the low state until time T2. Between time T1 and T2 the TTL buffers and the decoders have sufficient time to settle out, so that the signals applied to the gates of devices Q54 at time T2 represent the truly decoded addresses. As a result of the decoding, only one of the row address decoders and one of the column address decoders for any given 10 bit address will have the gates of devices Q54 in the high state. Thus, for one row decoder and one column decoder, transistors Q54 will be turned on so that at time T2 when CS prime goes to a low state and devices Q52 are turned off, the signals on line 52 for the addressed row address decoder and on line 54 for the addressed column address decoder will be in the high state. For all other row address decoders and column address decoders, device Q54 will be turned off and the signals on line 52 and 54 will remain in the low state. Capacitors C3 and C4 act as feed back capacitors which boost the gate voltage of devices Q51 and Q54 respectively on the selected decoders.

The signal on lines 52 and 54 for the 31 nonaddressed decoders for the rows and the 31 nonaddressed decoders for the columns are shown in FIGS. 2*e* and 2*g* respectively, and the equivalent signals for the one addressed row and the one address column are shown in FIGS. 2*f* and 2*h* respectively.

Now referring to FIG. 10, the read/write generator forming a part of the present invention memory may be seen. A TTL read/write signal may be applied on terminal 60 with the high state of the signal representing a write command and a low state representing a read command. TTL compatability is provided by the reference voltage of the reference circuit of FIG. 5 applied to device Q60 which in part establishes the conductivity point for device Q61. Prior to time T1 the chip select signal on terminal 28 is in the low state and the CS Prime signal on terminal 36 is in high state. Consequently, the output of the read/write generator on terminal 62 is clamped to the low state. At time T1 the chip select signal goes to the high state thereby turning on device Q60. At the same time the RE1 signal on terminal 32 goes to the low state, thereby turning off device Q63. Thus, the gate of device Q61 goes to the high state, with the capacitor C5 enhancing the rate of gate voltage change on the gate of device Q61. Of course, at this time, device Q64 turns off so that the read/write signal on terminal 60 is coupled to the gate of device Q65. Thus, at time T1 device Q65 will be turned on if a write signal has been applied to terminal 60 and will remain off if a read signal has been applied to terminal 60. Even if device Q65 is turned on, however, device Q62 is also on, and having a lower impedence than device Q65, the output at terminal 62 will remain substantially in the low state until time T2. At that time, the voltage on terminal 36, that is, CS prime, will go to the low state. If device Q65 is on, the voltage at terminal 62 will go to the high state, whereas if the device Q65 is off, the voltage on terminal 62 will remain in the low state due to the capacitance of the lines, including the capacitor C6. In that regard, capacitor C6 both adds to the capacitance of terminal 62 to maintain the terminal in the low state when a read signal has been applied, and enhances the drive on the gate of device Q65 through voltage feedback to change the state at terminal 62 to the high state if a write signal has been applied. Of course, the read/write signal from terminal 60 is coupled to the gate of device Q65 through device Q66, which is maintained in the on condition by connection to VDD terminal 26, except when capacitor C6 forces the gate of device Q65 above VDD. Thus, the waveform for the output of the read/write generator on terminal 62 is as shown in FIG. 2*i*.

Now referring to FIG. 11, the final separate circuit of the present invention may be seen. This curcuit is the data input buffer circuit and presents the data bit and the inverse thereof in response to a single TTL data input bit (e.g., the one bit input for the 1,024 × 1 bit memory). Devices Q70, Q71, Q72 and Q73 are connected so as to form a flip flop with capacitor C10 coupling the gate of device Q72 to the VSS terminal 20, thereby causing the flip flop to assume a state with device Q72 turned off upon initial application of power unless the preferred state is overridden by the state of the TTL data input. Devices Q70 and Q71 are maintained in an on condition by device Q74 coupled to VDD terminal 26. The TTL data input is applied to terminal 70, with the accommodation for the TTL levels being made by the connection of the gate of device Q75 to terminal 35 (the reference voltage of the reference generator of FIG. 5). Prior to time T1 the chip select signal applied to terminal 28 is in the low state, so that power is not applied to the flip flop. Accordingly, devices Q76 and Q77 are off. At the same time, the reset signal on terminals 30 is in high state, thereby turning on the devices Q78 and Q79 and precharging lines 72 and 74 to VREF). At time T1 the chip select signal goes to the high state, thereby applying power to the flip flop, and the reset signal goes to the low state, thereby turning off devices Q78 and Q79. If the data input signal at terminal 70 represents the low state, the flip flop will be set to a condition whereby line 76 will be in the low state, and line 78 will be in the high state, thereby turning on devices Q76 and Q80 and turning off device Q77 and device Q81. Accordingly, the output at terminal 76 will be in the low state and the output at terminal 78 will be in the high state. If, on the other hand, the TTL data input at terminal 70 is in the high state, the flip flop will be set so that the output on terminal 76 will be in the high state and the output on terminal 78 will be in the low state. The capacitor C12 is provided to enhance the drive on the date to device Q70 and Q71 by coupling the step in the chip select signal on terminal 28 to the gates (the device Q74 being substantially off during the CS pulse time). Consequently, the data input buffer operates on the TTL data input existing at time T1 and by time T2 has stabilized to present signals on terminals 76 and 78 representing the data input and the inverse thereof.

Now referring again to FIG. 9, the coupling means for coupling the data into the addressed column will now be described.

The output of the read/write generator on terminal 62 is supplied to terminal 62 of the column address decoders. For 31 of the 32 column address decoders, line 50 will be discharged to the low state. Consequently, device Q90 in these 31 column address decoders will be turned off, as will both of devices Q91 and Q92. These two devices are connected to terminals 76 and 78 of the date input buffer (FIG. 11) representing the data input bit and the inverse thereof. Thus, for the thirty-one column address decoders, the signals appearing on terminals 76 and 78 are not coupled to terminals 80 and 82 of the column decoders. Further, if a TTL read signal has been applied to terminal 60 of the read/write generator of FIG. 10, the signal on terminal 62 will be Q9. the low state, thereby again decoupling the addressed column decoder from the gates of devices Q91 and Q96 so that the signals on lines 76 and 78 are not coupled to lines 80 and 82 either. However, if there is a write command, the signal on line 62 will be in the high state, and for the one high addressed decoder, line 50 will remain in the high state. Consequently, device Q90 will be turned on, turning on both devices Q91 and Q92. These two devices are connected to terminals 76 and 78 of the data input buffer (FIG. 11) representing the data input bit and the inverse thereof. Thus, for the 31 column address decoders, the signals appearing on terminals 76 and 78 are not coupled to terminals 80 and 82 of the column decoders. Further, if a TTL read signal has been applied to terminal 60 of the read/write generator of FIG. 10, the signal on terminal 62 will be in the low state, thereby again decoupling the addressed column decoder from the gates of devices Q91 and Q92 so that the signals on lines 76 and 78 are not coupled to lines 80 and 82 either. However, if there is a write command, the signal on line 62 will be in the high state and, for the one high addressed decoder, line 50 will remain in the high state. Consequently, device Q90 will be turned on, turning on both devices Q91 and Q92, thereby directly coupling the signals on lines 76 and 78 to lines 80 and 82. Thus, coupling is achieved in the one addressed column address decoder only if there has been a write signal applied. (Capacitor C13 is used as a feedback element to increase the gate voltage of Q90 in the selected decoder, with device Q140 decoupling the feedback from line 50.)

Now referring again to FIG. 1, the overall operation of the memory matrix may be described in relation to the various support circuits hereinbefore discussed. Prior to time T1 the output at terminal 52 of all row address decoders which represent the signals to each of the row address lines (RAL's) are in the low state. Similarly, the output of all the column address decoders on line 54 which represent the column read lines (CRL's) are in the low state. Accordingly, devices Q100 as well as devices Q3 and Q4 for each of the 1,024 memory cells are turned off. Also, the reset signal on terminals 30 is in the high state, thereby turning on devices Q102 (4 per column) to charge the column cell lines to VREF, the voltage on terminals 24. The reset signal also turns on devices Q104 to charge lines 81 to VREF. Thus, devices Q106, connected in a manner similar to a flip flop, are off, with the gate, source and drain regions of the devices all being coupled to the same voltage.

For each column, devices Q108 and Q110 are turned on by VREF being coupled to the gates thereof. Since devices Q112 are in the off condition, and devices Q114 are turned on by the reset signal, lines 82 and 84 are also charged to VREF. The voltage on lines 82 and 84, however, is not coupled to the data output terminals D01 and D02 since devices Q116 are maintained in the off condition by the low state of the chip select signal applied to the gates thereof.

As previously mentioned, the state of each memory cell is maintained by the charge pump devices CP1 and CP2 for the cells. At time T1 the chip select signal on terminal 28 goes to the high state and the reset signal on terminal 30 goes to the low state. Accordingly, devices Q102 and Q114 are turned off, and devices Q116 are turned on. In general, this decouples the various lines from the reference voltages, so the lines maintain their state by the stored charges thereon. At time T2 one of the row address lines RAL (the addressed row) goes to the high state, turning on devices Q3 and Q4 for each memory cell in that row. Accordingly, the state of each memory cell in that line or row is coupled to the column cell line for the respective column. Accordingly, for the first row and first column, if the row address line RAL 1 was addressed and therefore devices Q3 and Q4 for that cell were turned on, and if the state of the cell was such that device Q1 was conducting, the column cell line CCL1a would immediately begin a slow discharge toward VSS, the voltage at terminals 20. Since Q2 under this condition would be in the off condition, the column cell line CCL1b would not be significantly discharged. Also at time T2, one of the column cell read lines CRL (Terminal 54 of FIG. 9) of the addressed column address decoder goes to the high state, turning on devices Q100 and Q112 for that addressed column. Accordingly, for that addressed column, the voltage on line 81 goes to VSS, the voltage on terminal 20. Thus, the flip flop comprised of the two devices Q106 for that column is activated, and sensing the small differential voltage between the addressed column cell lines, the flip flop operates as a high gain sense amplifier, driving the column cell lines to the full MOS logic levels corresponding to the cell condition. The operation of the sense amplifier tends to discharge both column sense lines. In fact, for this purpose, relatively high impedence devices Q101, which are permanently on, are coupled to each column cell line so as to provide some source of charge to the column cell lines, and particularly to the one column cell line in each column which is to remain in the high state, dependent upon the condition of the addressed cell in that column. Accordingly, one of devices Q108 and Q110 for that column will be turned on, as will the corresponding device Q112 as a result of the signal on the column read line (CRL). Thus, one of lines 82 and 84 will be discharged to the low state, which in turn will be coupled to one of the outputs D01 and D02 through devices Q116 turned on by the chip select signal on terminal 28. Thus, the state of a single cell within the addressed row is coupled by the addressing of the column containing that cell to lines 82 and 84, and through devices Q116 to the output terminals D01 and D02. Also, as preveiously described, if a write command has been applied, one of the column write lines (CWL) for that column (terminal 80 or terminal 82 of the Y address decoder of FIG. 9) will go to the high state, with the other of these two lines going to the low state. The condition of these lines, of course, is determined by the TTL data input bit, as previously described with respect to the data input buffer and the column address decoders. If the state of the addressed cell does not coincide with the state of the column write lines for the addressed column, the column write lines override the cell and cause the cell to change state, thereby writing into the cell the state as determined by the TTL data input applied to terminal 70 of the data input buffer (FIG. 11).

If a read operation is being executed, the output information on the output terminals D01 and D02 is valid approximately 20 nanoseconds after time T2 and will remain valid for a few milliseconds if chip select remains high. Therefore, in the preferred embodiment, the chip select signal may safely return to the low state at time T3 for a read operation, approximately 50 nanoseconds after time T1, provided the information has been read out and retained by the equipment utilizing the memory. For a write operation, additional switching must occur, or at least potentially must occur, dependent upon whether or not the write operation actually causes a change in state of the addressed cell. Consequently, the time required to write, and particularly for the written information to be valid on the output terminals is approximately 40 nanoseconds. Thus, for a read operation, the output may be safely read 50 nanoseconds after time T1, and the chip select returned to the low state thereafter, whereas for a write operation the chip select should remain in the high state for approximately 70 nanoseconds before returning to the low state at time T3. Of course, the chip select may remain in the high state substantially indefinitely, though the output will remain valid for only a few milliseconds, as the storage of the output data is by way of stored charges on the various lines.

When the chip select signal is changed to the low state at time T3 after a read or write operation, the reset signal will accordingly go to the high state. This resets the various circuits to the conditions existing before time T1, as already hereinbefore described. In particular, many of the various lines are charged to VREF and accordingly, ample time must be allowed before the chip select signal is again taken to the high state inititating a subsequent read or write operation. In the preferred embodiment approximately 100 nanoseconds must be allowed between time T3 and the time T1 of the next read or write operation so as to allow the changes initiated at time T3 to settle out.

Figure 12:
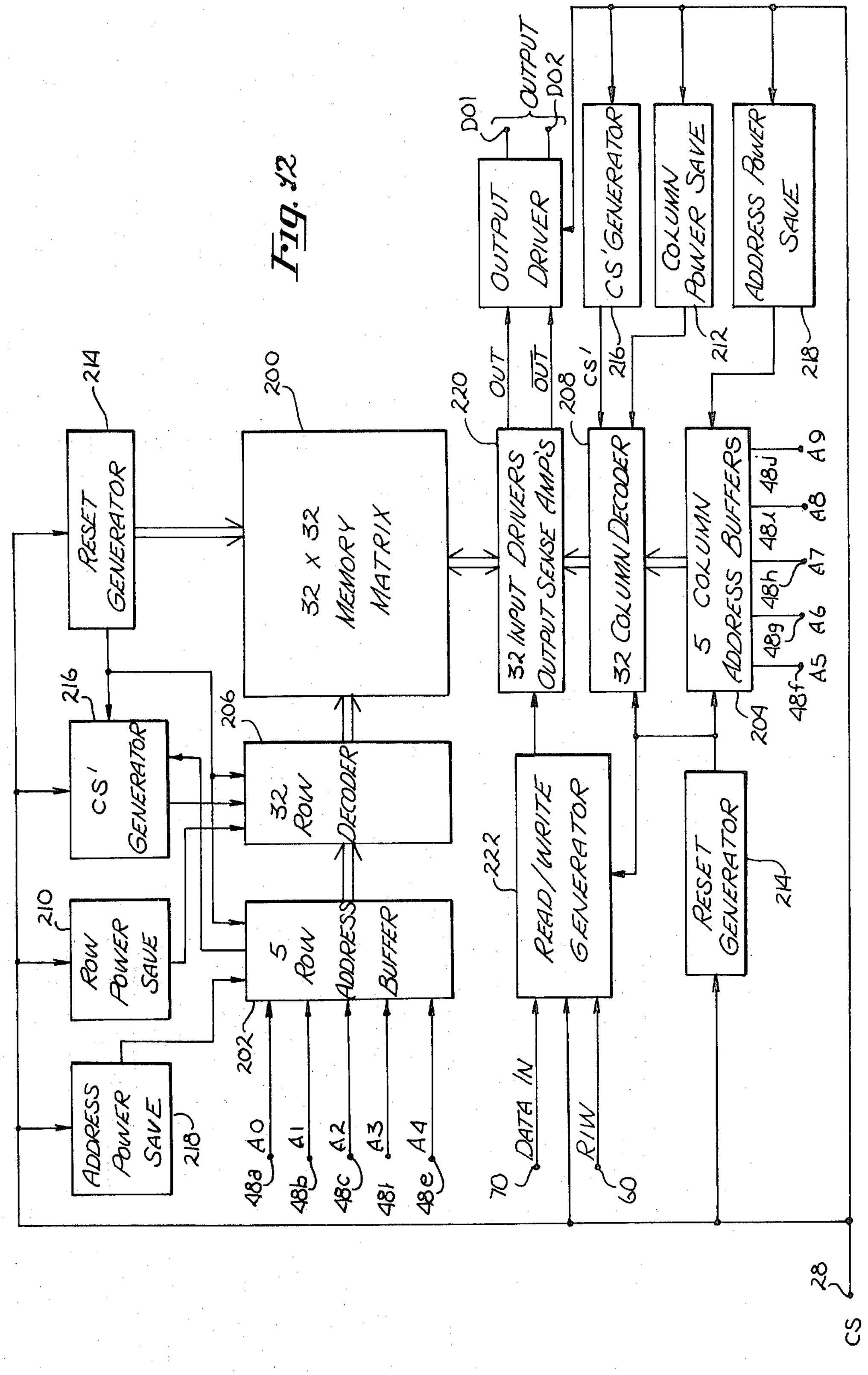
FIG. 12 is a block diagram of the preferred embodiment of the present invention illustrating the plurality and cooperative operation of the various circuits of the present invention to provide a very high speed, read/write random access semiconductor memory operative from a single clock signal and not requiring periodic refreshing.

Now referring to FIG. 12, a block diagram showing the overall organization of the present invention memory may be seen. This diagram presents in an integrated form the interconnection and cooperative operation of the various circuits, hereinbefore described, to achieve the desired result. In the preferred embodiment, all the circuits, as previously described and in the numbers shown in FIG. 12, are formed on a single silicon chip. In the block diagram the power supply terminals, for clarity, are purposely not shown. The signal inputs to the chip are comprised of the chip select signal on terminal 28, a data input signal on terminal 70, a read/write command input in terminal 60, five row address data bits on terminals 48 (terminals 48*a* through 48*e*, also identified as the address bits AO through A4) and five column address bits on terminals 48*f* through 48*j* (also identified as the address bits A5 through A9). The data input signal on terminal 70 is only required when a write command is simultaneously applied at terminal 60. The outputs of the memory appear on the output terminals D01 and D02, as previously described. The memory matrix, generally indicated by the numeral 200, is the 32 × 32 memory cell matrix previously described with respect to FIG. 1. Each bit of the five bit row address is applied to one of the five row address buffers 202. Similarly, the remaining five address bits are applied to the five column address buffers 204, each of the address buffers being as shown in FIG. 7. The outputs of the five row address buffers 202 and the five column address buffers 204 are applied to the 32-row decoders 206 and the 32 column decoders 208, the signals applied to each of the row decoders and each of the column decoders being a unique combination of the five address bits and the inverse thereof to result in the appropriate addressing of an individual row and an individual column for each address input. The row and column decoders are as shown in the circuits of FIGS. 8 and 9. However, it will be noted therein that a portion of the circuits have been identified as a power save circuit. One power save circuit is used for all 32 row decoders and is therefore separately identified as a power save 210 in FIG. 12. Similarly, one power save circuit 212 is used for the 32-column decoders. While a single reset generator, as shown in FIG. 3, could be used for the entire memory, two such generators are used in preferred embodiment to provide extra drive, these generators being identified by the numeral 214 in FIG. 12. Similarly, two CS Prime generators 216 are used in the preferred embodiment. A portion of the reset generator circuit shown in FIG. 3 cooperates with the address buffers to limit the power required thereby. Thus, in FIG. 12, this portion of the circuit is separately identified by the numerals 218 (the specific function of the power save circuits 212 and 218 will be subsequently described). There are also provided 32 input drivers and output sense amplifers 220. The input drivers are comprised of devices Q90, Q91 and Q92 on each of the column address decoders (FIG. 9), with the output sense amplifiers being comprised of devices Q106 and Q100 on each column of the memory matrix (FIG. 1). The input drivers are activated by the read/write generator 222, the circuit of which is shown in FIG. 10.

It is to be noted that in accordance with the block diagram of FIG. 12, a single power save circuit is used for each of the 32 row decoders and a similar such circuit is used for each of the 32 column decoders. This circuit is comprised of devices Q51 and Q53, as well as capacitor C3 (which may be formed by an overlap of the gate of device Q51 with one of the underlying regions thereof). The operation of a power save is as follows:

Initially line 50 is precharged by the reset signal applied to device Q45 (FIGS. 8 and 9). After time T1, the chip select signal on terminal 28 goes to the high state. Immediately after time T1, before decoding is complete, CS Prime is in the high state, and devices Q52 are on. Similarly, devices Q50 are held on by the voltage applied on terminal 38, so that the high state of line 50 holds devices Q54 on. Accordingly, device Q51 in each of the power save circuits is driving 32 series combinations of devices Q52 and Q54. The impedences of devices Q52 and Q54 are selected to be approximately equal to the impedence of devices Q51. Consequently, Q51 is high in impedence compared to the parallel combination of 32 loads comprised of devices Q52 and Q54, so that most of the voltage drop occurs across device Q51 and the power dissipation in the decoders is limited. As decoding proceeds in the time interval between time T1 and T2, the line 50 in 32 of the 32 decoders will be forced into the low state by the conduction of at least one of devices Q40 through Q44 in those decoders. Accordingly, just before time T2, the load on device Q51 will have been reduced from the parallel combination of 32 series combinations of devices Q52 and Q54 to a single such series combination, thereby resulting in a substantial increase in the voltage on line 150 in each of these power save circuits. Capacitor C3, which had been charged through device Q53 when the voltage on line 150 was relatively low, feeds back this increased voltage to the gate of device Q51. Since the gate of device Q53 is now lower than this feedback voltage, device Q53 is substantially non-conducting and the gate of device Q51 may be caused by capacitor C3 to rise to a voltage substantially above the high state voltage. At time T2 when CS Prime goes to the low state, the voltage on the single addressed row address line 52 will go to the high state. Capacitor C4 couples this rise in voltage to the gate of device Q54, thereby raising the voltage on that gate to a voltage level substantially above the high state voltage with device Q50 decoupling the gate of device Q54 from line 50. Thus, both devices Q51 and Q54 are forced to the on condition by a gate voltage exceeding the high state voltage by more than the threshold voltage to result in the substantially direct coupling of the addressed row address line to the chip select signal on terminal 28.

At time T3 the chip select signal on terminal 28 returns to the low state due to Capacitor C3 reducing the gate voltage of Q51 to less than VDD. At the same time the CS Prime signal on terminal 36 returns to the high state, thereby turning on device Q52. Similarly, the reset signal on terminal 30 returns to the high state, thereby causing a rapid increase in the voltage on line 50 in each decoder. Because of the capacitive coupling between the region of devices Q50 coupled to lines 50 and the gates thereof coupled to terminal 38, the gate voltages will be caused to increase in response to the jump in voltage on the 32 lines 50, thereby at least temporarily holding device Q52 on so that the full voltage of line 50 may appear on the gate of device Q54 and to charge capacitor C4 and the gate of device Q54. In this regard it will be noted that device Q19 in FIG. 6 has an impedence which is much greater than that of device Q18, with the voltage on terminal 38 being approximately one threshold voltage below the positive power supply voltage on terminal 26. Thus, as the voltage on terminal 38 is encouraged to temporarily increase by the switching of all of lines 50 to the high state, device Q18 will be turned off since its gate is now coupled to the region having the lowest voltage, and only the conductance of device Q19, relatively high in impedence, will cause the voltage of terminal 38 to return from a momentary level above the positive power supply voltage to the lower level (also when device Q52 in the single addressed row decoder and the single addressed column decoder turns off at time T2, the feedback voltage to the gate of device Q54 by capacitor C4 is decoupled from line 50 by action of device Q50 since the gate thereof is now coupled through a voltage lower than the two regions thereof). Thus, by the use of the single power save on a plurality of decoders, the current drain when both devices Q52 and Q54 of each decoder are on is limited, yet a full high state signal is applied to the addressed row as a result of capacitor C3 overcoming the threshold of device Q51, and as a result of capacitor C4 overcoming the threshold of device Q54, with those voltages being essentially decoupled from the associated circuitry as a result of the action of devices Q50 and Q53.

In much the same manner, Capacitor C12 and device Q74 in the data input buffer (FIG. 11) couple a voltage to the gates of devices Q70 and Q71 when the chip select signal on terminal 28 goes to the high state, which voltage will exceed the high state voltage plus the threshold of devices Q70 and Q71, so as to provide further drive for the flip flop of the buffers, Device Q74 provides the initial charging of capacitor C12 and decouples the higher voltage from terminal 26 when the chip select signal on terminal 28 goes to the high state.

Now referring to FIG. 7, it may be seen that the TTL address buffers are activated only when the signal applied on terminal 34 (also identified by the letters PS as signifying a power save function) and the chip select signal on terminal 28 are both in high state. Though the chip select signal is in the high state from time T1 to time T3 which, depending upon the application, may be relatively long compared to the time interval between time T1 and T2, the power save portion of the circuit of FIG. 3 maintains a high state voltage on terminal 24 only in the time interval between time T1 and time T2, and further maintains this voltage at a level substantially above the high state level so as to overcome the threshold of devices Q21 and Q24 in the address buffers. Accordingly, before time T1 the chip select signal on terminal 28 is low (FIG. 3), device Q6 is off and device Q10 is on. At the same time, the CS Prime signal on terminal 36 is in the high state, holding device Q35 on. This holds device Q36 off, and the voltage at terminal 34 is in the high state. Thus, though the voltage at terminal 34 is in the high state prior to time T1, the chip select signal on terminal 28 is not. At time T1, the chip select signal goes to the high state, thereby turning off device Q10 and simultaneously raising the low voltage side of capacitor C2 to the high state, thereby providing a voltage on terminal 34 exceeding the high state voltage by more than the threshold voltage of devices Q21 and Q24 in the address buffers.

During the time interval between time T1 and T2 devices Q37 and Q35 are both on, with devices Q35, having a lower impedence, holding device Q36 off. At time T2 the CS Prime signal on terminal 36 goes to the low state, turning off devicce Q35, thereby turning on device Q36 through device Q37 to force terminal 34 into the low state, thereby turning off the address buffers. Thus, it may be seen that through this power save circuit, the operation of the address buffers is limited to the time interval between time T1 to time T2, thereby limiting the power dissipation in the address buffers while providing a high level drive therefor when required.

There has been described herein a new and unique semiconductor memory using MOS devices and incorporating charge pumping to maintain the state of the memory without refresh. The memory incorporates various circuits compatible with TTL circuits for buffering and for providing high speed operation of the memory as a result of the generation and coupling of high driving signal to the appropriate circuits. The use of a flip flop type circuit in the address buffers, the data buffers, and for the sense amplifier provides very high speed operation upon initiation of the circuits, rapidly driving the circuits to the state indicated by the inputs. Power save circuits coupled to various other circuits limit the power dissipated in these circuits, yet provide high driving voltages to overcome the threshold in series devices within these circuits, with additional devices being used to isolate the high driving voltages from other lines in the circuit. The net result is a memory matrix which does not require refresh and which is operative with a single non-critical clock signal to fully execute a read or a write operation.

It is to be understood, of course, that various of the circuits described herein may be utilized alone or in various combinations with memories of other designs, as well as in other applications, depending upon the requirement of the particular application and the end result desired. Thus, it will be understood by those skilled in the art that various changes in form and detail may be made in the present invention semi-conductor memory, and the various circuits comprising a part thereof, by one skilled in the art, without departing from the spirit and scope of the present invention.

We claim:

1. A memory comprising:

a plurality of memory cells formed on a substrate using integrated circuit techniques, each of said cells having first, second, third and fourth MOS devices and first and second charge pump devices, said MOS devices having first and second regions and an insulated gate, said charge pump devices having at least one first region and an insulated gate-like region, said first regions of said first and second MOS devices being coupled together and to a first power supply terminal, said first region of said first charge pump device being coupled to said second region of said first MOS device and to said gate of said second MOS device, said first region of said second charge pump device being coupled to said second region of said second MOS device and to said gate of said first MOS device, said first region of said third MOS device being coupled to said second region of said first MOS device, said first region of said fourth MOS device being coupled to said second region of said second MOS device, said second regions of said third and fourth MOS devices being coupled to first and second lines adapted to be precharged to a first voltage, said gates of said third and fourth MOS devices being coupled to an address line, said substrate being adapted for coupling to a second voltage, said gate-like region of said charge pump devices being coupled to an AC voltage input terminal;

an AC voltage generating means, said generating means being coupled to said AC voltage input terminal and being a means for generating an AC voltage having a frequency of at least 100 KHz, said AC generating means further being a means for generating an AC voltage having a peak to peak amptitude at least exceeding said second voltage at one extreme and exceeding said first voltage by at least the threshold voltage of said MOS devices at the other extreme.

2. In a semiconductor memory:

a plurality of memory cells arranged in rows and columns, each of said cells having first, second, third and fourth MOS devices having first and second regions and an insulated gate, said first regions of said first and second MOS devices being coupled to a power supply terminal, said second region of said first MOS devices being coupled to said first region of said third MOS device, and to said gate of said second MOS device, said second region of said second MOS device being coupled to said first region of said fourth MOS device and to said gate of said first MOS device, all of said second regions of said third MOS devices within each column of cells being coupled to a first column cell line for that column, all of said second regions of said fourth MOS devices within each column of cells being coupled to a second column cell line for that column thereby providing a pair of column cell lines for each column, all of said gates of said third and fourth MOS devices within each row of cells being coupled to a row address line for that row;

sense amplifiers coupled to each pair of column cell lines, each of said sense amplifiers having fifth, sixth and seventh MOS devices, each having first and second regions and an insulated gate, said first region of said fifth MOS device being coupled to said first column cell line for a respective pair and to said gate of said sixth MOS device, said first region of said sixth MOS device being coupled to said second column cell line of said respective pair, and to said gate of said fifth MOS device, said second regions of said fifth and sixth MOS devices being coupled to said first region of said seventh MOS device, said second region of said seventh MOS device being coupled to a second power supply terminal, said gate of said seventh MOS device being coupled to a decoded column address line.

3. The memory of claim 2 further comprised of a means for precharging each column cell line and the line coupled to said second regions of said fifth and sixth MOS devices to a predetermined voltage.

4. The memory of claim 2 further comprised of a means for coupling the state of each of said pair of column cell lines to a pair of output lines responsive to a signal on the respective decoded column address line.

5. In an MOS semiconductor memory having a plurality of memory cells arranged in rows and columns with each cell in each column being coupleable to a pair of column cell lines for that column to cause a differential voltage between the first and second cell lines in the pair dependent on the state of the cell, a sense amplifier for pairs of column cell lines comprising first, second and third MOS devices each having first and second regions and an insulated gate, said first region of said first MOS device being coupled to said first column cell line in a pair of lines and to said gate of said second MOS device, said first region of said second MOS device coupled to said second column cell line in the respective pair of lines and to said gate of said first MOS device, said second regions of said first and second MOS devices being coupled to said first region of said third MOS device, said third MOS device having its said second region coupled to a power supply terminal and its said gate coupled to a decoded column address line.

6. The sense amplifiers of claim 5 further comprised of means for coupling the output of each sense amplifier to first and second output lines comprising fourth, fifth and sixth MOS devices, each having first and second regions and an insulated gate, said fourth MOS device having its said first region coupled to said second regions of said fifth and sixth MOS devices, its said gate coupled to a decoded column address line and its said second region coupled to a power supply terminal, said fifth MOS device having its said first region coupled to said first output line and its gate coupled to said first column cell line of a pair of column cell lines, and said sixth MOS device having its said first region coupled to said second output line and its gate coupled to said second column cell line of a respective pair of column cell lines.

7. The MOS semiconductor memory of claim 5 further comprised of means for precharging said column cell lines to a predetermined voltage.

8. In an MOS semiconductor memory, an input buffer comprising first, second, third and fourth MOS devices, each having first and second regions and an insulated gate, said first and second MOS devices having their first regions coupled to a power supply terminal, their said second regions coupled to said second regions of said third and fourth MOS devices, respectively, and to said gates of said second and first MOS devices respectively, said third and fourth MOS devices having their said second regions coupled to a first reference terminal and their said gates coupled to a second reference terminal, thereby defining a flip-flop means operative upon the simultaneous occurrance of reference signals on said first and second input terminals, said input buffer being further comprised of a means responsive to an input to determine the state of said flip-flop means and means for coupling the state of the flip-flop means to at least one buffer output connection.

9. The buffer of claim 8 wherein the state of said flip-flop means is initially determined by a capacitance between said gate of said first MOS device and said power supply terminal unless said flip-flop means is driven to the opposite state by said means responsive to an input.

10. The buffer of claim 8 wherein said means for coupling the state of the flip-flop means to at least one buffer output connection is a means for coupling the logic state of the flip-flop means and the inverse thereof to first and second buffer output connections, respectively.

11. The buffer of claim 8 wherein said first and second reference terminals are timing signal terminals.

12. The buffer of claim 8 wherein said first reference terminal is a timing signal terminal and said second reference terminal is a second power supply terminal, said gates of said third and fourth MOS devices being coupled to said second power supply terminal through a fifth MOS device having first and second regions and an insulated gate, said first region of said fifth MOS device being coupled to said gates of said third and fourth MOS devices, said gate and said second region of said fifth MOS device being coupled to said second power supply terminal, the capacitance between said gates and said second regions of said third and fourth MOS devices being substantially greater than the minimum value obtainable for such devices.

13. In an MOS semiconductor memory, using MOS devices which are conductive between first and second regions responsive to a gate voltage applied thereto, a plurality of decoders and a power save circuit:

each of said decoders having first and second MOS devices and having a means for charging a decoder line to a first predetermined voltage, said decoders each having a means for receiving address signals and changing the voltage on its said decoder line to a second predetermined voltage upon the occurrance of any address signals except a specific combination of address signals, each of said decoder lines being coupled to said gate of said first MOS device, said second region of said first MOS device being coupled to said first region of said second MOS device, said second region of said second MOS device being coupled to a first power supply voltage approximately equal to said second predetermined voltage, said gate of said second MOS device being coupled to a first timing signal;

said power save circuit having third and fourth MOS devices, said third MOS device having its first region coupled to a second timing signal, its gate coupled to said second region of said fourth MOS device, and its second region coupled to said first region of said first MOS devices in each decoder, said third MOS device further having a substantial capacitance coupled between its gate and its second region, said gate and said first region of said foruth MOS device being coupled to a second power supply voltage.

14. The apparatus of claim 13 further comprised of a generating means for generating said first timing signal, said generating means having a means for charging a line coupled to said gates of said second MOS devices to a third reference voltage, and a decoding means for changing the voltage of said line to a fourth reference voltage, said last named decoding means being a means for decoding at least one bit, and the inverse thereof, of an address signal.

15. The apparatus of claim 14 further comprised of a means for forcing said first timing signal from a voltage near said third reference voltage toward said fourth reference voltage responsive to the initial change of said timing signal toward said fourth reference voltage.

16. The apparatus of claim 14 wherein said first and third reference voltages are the same voltage and said second and fourth reference voltages are the same voltages.

17. The apparatus of claim 13 wherein each of said first MOS devices have a substantially enhanced capacitance between its gate and its second region.

18. The apparatus of claim 17 further comprised of fifth and sixth and a plurality of seventh MOS devices, said fifth MOS device having its said gate and said first region coupled to said second power supply terminal, said sixth MOS device having its said gate coupled to said second power supply terminal, its said first region coupled to said second region of said fifth MOS device, and its said second region coupled to said first power supply terminal.

19. In an MOS memory:

a plurality of MOS memory cell means arranged in rows and columns, each of said memory cell means having first and second logic states;

charge pumping means for maintaining the logic states of said memory cell means;

row coupling means for coupling the state of each memory cell means in a row to a respective pair of column cell lines whereby each of said pair of column cell lines may be encouraged to assume first and second opposite logic states indicative of the state of said memory cell means in said row, said row coupling means being responsive to decoded row addresses;

sense amplifier means responsive to decoded column addresses, said sense amplifier means being a means for detecting a differential voltage on a pair of column cell lines and driving said column cell lines to the full logic levels of the state indicated by said differential voltage;

means for coupling the logic states of the column cell lines to a pair of output lines; and means for precharging said pair of column cell lines to a predetermined voltage.

20. In the memory of claim 19, means having substantial impedance and coupled to said predetermined voltage for encouraging each column cell line in each of said pairs of column cell lines to said predetermined voltage.

21. The memory of claim 19, further comprised of:

buffer means coupled to a plurality of inputs for receiving a plurality of coded address inputs and providing as outputs each said address input and the inverse thereof upon the occurrance of a first timing signal;

row address decoding means coupled to said buffer means for decoding row addresses upon the occurrance of said first timing signal and for providing to said row coupling means decoded row address signals upon the occurrance of a second timing signal;

timing means coupled to said first timing signal for providing as an output a second timing signal delayed in time with respect to the occurrance of said first timing signal; and, column address decoding means coupled to said buffer means for decoding column addresses upon the occurrance of said first timing and for providing decoded column addresses to said sense amplifiers upon the occurrance of said second timing signal.

22. The memory of claim 21 wherein said buffer means are clocked flip-flop means.

23. The memory means of claim 21 wherein said timing means is coupled to at least one buffer means and includes a means for decoding one of said coded address inputs and the inverse thereof, said means for decoding one of said coded address inputs being slower in operation than said row address and said column address decoding means.

24. The memory of claim 21 further comprised of a data input means responsive to a data input signal and said first timing signal to provide said data input signal and the inverse thereof, and a read/write generator means coupled to said second timing signal, said column address decoders and each said pair of column cell lines, said read/write generator means being a means for receiving a read/write command and driving the addressed pair of column cell lines to the logic states commanded by said data input signal upon the occurrance of said second timing signal.

25. The memory of claim 24 wherein said data input means is a clocked flip-flop means.

* * * * *